United States Patent
Cvancara (10) Patent No.: US 6,629,448 B1
(45) Date of Patent: Oct. 7, 2003

(54) IN-SITU TESTING OF A MEMS ACCELEROMETER IN A DISC STORAGE SYSTEM

(75) Inventor: Dustin M. Cvancara, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 384 days.

(21) Appl. No.: 09/766,285

(22) Filed: Jan. 19, 2001

Related U.S. Application Data
(60) Provisional application No. 60/184,927, filed on Feb. 25, 2000.

(51) Int. Cl.[7] .............................................. G01P 15/08
(52) U.S. Cl. ....................................................... 73/1.38
(58) Field of Search ................................. 73/1.37, 1.38, 73/1.41

(56) References Cited

U.S. PATENT DOCUMENTS

| | | | |
|---|---|---|---|
| 3,948,107 A | 4/1976 | Asmar et al. ................... 73/503 |
| 4,315,236 A | 2/1982 | Tominaga et al. .............. 338/4 |
| 4,814,969 A | 3/1989 | Kiyooka ....................... 364/186 |
| 5,355,712 A | * 10/1994 | Petersen et al. .............. 73/1.38 |
| 5,410,915 A | 5/1995 | Yamamoto .................... 73/517 |
| 5,447,051 A | * 9/1995 | Hanks et al. |
| 5,499,526 A | * 3/1996 | Muro ............................ 73/1.38 |
| 5,521,772 A | 5/1996 | Lee et al. ...................... 360/75 |
| 5,570,300 A | 10/1996 | Henry et al. ............. 364/551.01 |
| 5,627,751 A | 5/1997 | Davis et al. ............. 364/424.034 |
| 5,663,847 A | 9/1997 | Abramovitch ............. 360/77.02 |
| 5,737,961 A | 4/1998 | Hanisko et al. ................ 73/1.38 |
| 5,786,621 A | 7/1998 | Saif et al. ...................... 257/415 |
| 5,856,895 A | 1/1999 | Schaenzer et al. ............ 360/103 |
| 5,859,358 A | 1/1999 | Wood et al. ....................... 73/9 |
| 5,880,369 A | 3/1999 | Samuels et al. ............. 73/514.32 |
| 5,889,389 A | 3/1999 | Bothra et al. ................. 320/166 |
| 5,895,858 A | 4/1999 | Malone et al. ................. 73/1.38 |
| 5,900,529 A | 5/1999 | Hanisko et al. ................ 73/1.38 |
| 5,908,986 A | 6/1999 | Mitamura .................. 73/504.12 |
| 5,952,752 A | 9/1999 | Kim ............................. 310/90 |
| 5,979,249 A | 11/1999 | Koo et al. ................. 73/862.541 |
| 5,982,573 A | 11/1999 | Henze ............................. 360/75 |
| 5,990,473 A | 11/1999 | Dickey et al. ............. 250/231.13 |
| 6,038,924 A | 3/2000 | Lee et al. ................... 73/514.34 |
| 6,064,928 A | 5/2000 | Wilson et al. ................... 701/34 |

* cited by examiner

Primary Examiner—Robert Raevis
(74) Attorney, Agent, or Firm—Westman, Champlin & Kelly (57) ABSTRACT

A disc storage system performing an in-situ test on a MEMS accelerometer, in a disc drive. The circuit includes a control circuit that establishes a desired self test condition conducive to the in-situ test during a self test interval. The circuit includes a stored reference representing at least one characteristic limit of an integrity output of the, MEMS accelerometer. The circuit includes a test circuit that receives the integrity output value and the stored reference during the in-situ test interval and that generates an in-situ test output representative of integrity of the MEMS accelerometer. Damaged or degraded MEMS accelerometers can be diagnosed in-situ.

18 Claims, 11 Drawing Sheets

IN-SITU TESTING OF A MEMS ACCELEROMETER IN A DISC STORAGE SYSTEM

CROSS REFERENCE TO RELATED APPLICATION

This application claims priority benefits from U.S. Provision Application No. 60/184,927 titled "Self-testing of a micro-electro-mechanical systems (MEMS) sensor," filed Feb. 25, 2000.

FIELD OF THE INVENTION

The invention relates to disc drive storage systems using accelerometers that are manufactured as micro-electro-mechanical systems (MEMS). In particular, the invention relates to the in-situ testing of MEMS accelerometers for use with disc drives.

BACKGROUND OF THE INVENTION

Accelerometers are used in conjunction with disc drives to provide real time data for various control systems associated with the disc drive.

In U.S. Pat. No. 5,521,772 Lee et al., for example, an acceleration rate sensor is mounted on a disc drive housing and used to inhibit writing to the disc when the disc drive is subjected to external shock or vibration. In U.S. Pat. No. 5,856,895 Schaenzer et al., an accelerometer is integrally formed in a slider of a disc drive and its output is used to improve servo performance in the disc drive.

Accelerometers can be manufactured using MEMS technology, however, such MEMS accelerometers are extremely small, delicate and subject to damage from electrical or mechanical overstresses. MEMS technology uses microstructure fabrication techniques that are adapted from integrated circuit manufacture such as photolithographic masking, etching, vapor deposition, ion implantation and the like. The extremely small size and mass of MEMS accelerometers makes them especially useful in high performance applications such as disc drive systems. In such systems, there is a desire to diagnose accelerometer failure, without disassembling the accelerometer for inspection. The installation of a second accelerometer merely to test a first MEMS accelerometer would add to the mass, cost and complexity of the system. The artificial application of a known, calibrated acceleration force to test the accelerometer would be cost prohibitive.

A method and an apparatus are needed to test a MEMS accelerometer in a disc storage system without disassembling the MEMS accelerometer and without the undesirable addition of a second accelerometer for comparison, and without the artificial application of an acceleration force to the disc drive.

SUMMARY OF THE INVENTION

Disclosed is a method and circuit performing a self test on a MEMS accelerometer associates with a disc drive. The MEMS accelerometer includes a self test input that establishes a self test condition in the MEMS accelerometer during a self test interval. The circuit also includes a stored reference representing at least one characteristic limit of an integrity output of the MEMS accelerometer. The circuit also includes a test circuit that is adapted to receive at least one integrity output value and the stored reference during the self test interval and that generates a self test output representative of integrity of the MEMS accelerometer.

Degraded integrity or damage to a MEMS accelerometers can be diagnosed in-situ. Mounting of a second accelerometer or other sensors for diagnosis can be avoided. Disassembly of the MEMS accelerometer for diagnosis can also avoided. Artificial application of an acceleration force to the disc drive can also be avoided.

In a preferred embodiment, the MEMS accelerometer is a capacitive accelerometer that senses rotational vibration and that is mounted on the associated disc drive.

Additional features and benefits will become apparent with a careful review of the following drawings and the corresponding detailed description.

DETAILED DESCRIPTION OF THE ILLUSTRATED EMBODIMENTS

Figure 1:
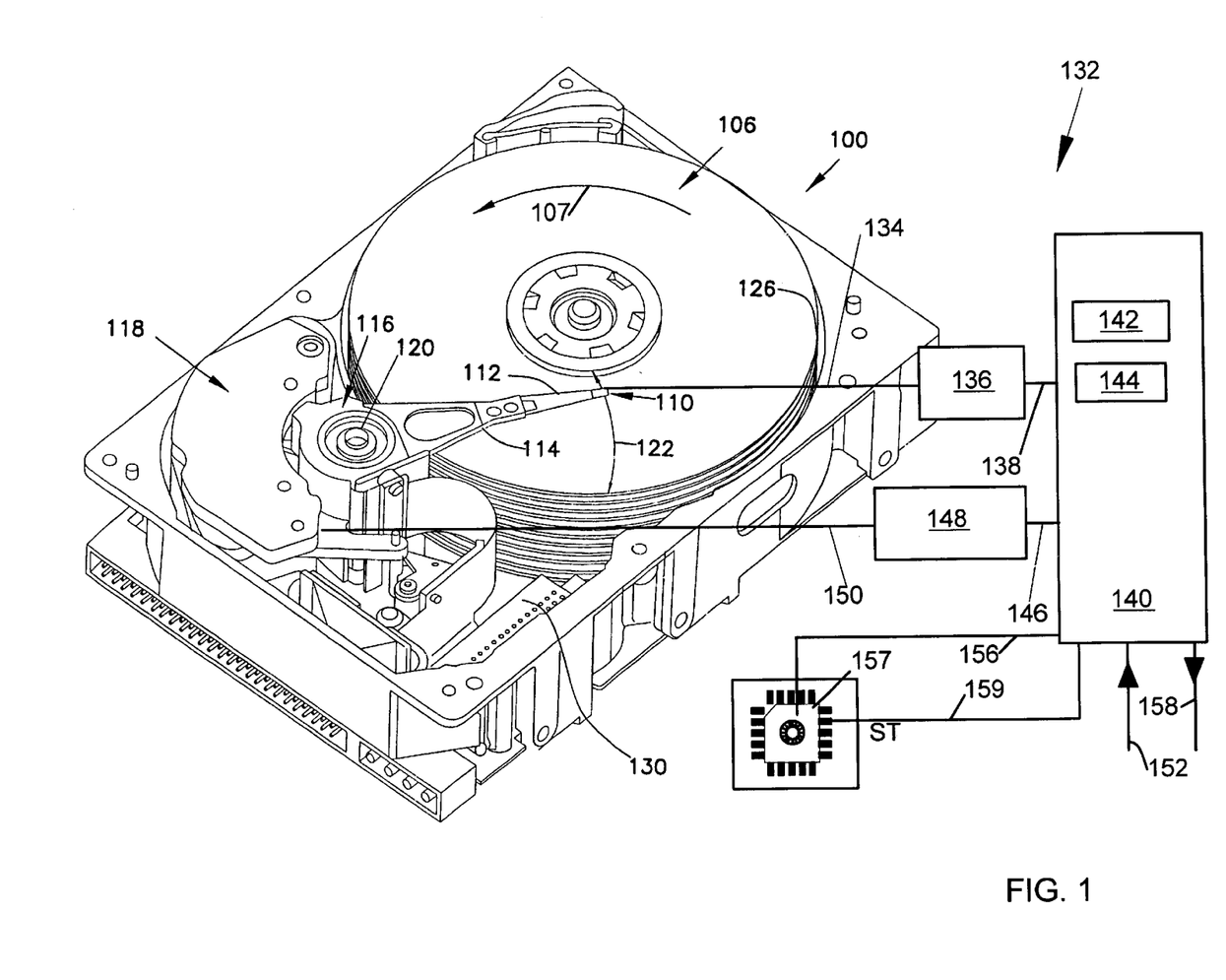
FIG. 1 illustrates an embodiment of a disc drive including a processor adapted to perform an in-situ test of a MEMS accelerometer.

In FIG. 1, an embodiment of a disc drive 100 includes a processor 140 that performs an in-situ test of a MEMS accelerometer 157. Disc drive 100 includes a disc pack 126 having storage surfaces 106 that are typically layers of magnetic material. The disc pack 126 includes a stack of multiple discs. A read/write head assembly 112 includes a read/write transducer 110 for each stacked disc. Disc pack 126 is spun or rotated as shown by arrow 107 to allow read/write head assembly 112 to access different rotational locations for data on the storage surfaces 106 on the disc pack 126. MEMS accelerometer 157 is mounted and oriented such that MEMS accelerometer 157 experiences rotational acceleration that is similar to the rotational acceleration experienced by read/write head assembly 112 when the disc drive 100 is moved or subject to vibration. MEMS accelerometer 157 is preferably mounted in or on disc drive 100, however, MEMS accelerometer 157 can alternatively mount in close proximity to disc drive 100 so that MEMS accelerometer 157 experiences substantially the same acceleration as disc drive 100. MEMS accelerometer 157 provides feedback on line 156 that is used in controlling the position of read/write transducer 110. MEMS accelerometer 157 includes a self test input ST on line 159 that can be activated to apply a simulated acceleration to MEMS accelerometer 157.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112.

Disc drive 100 includes a disc driver controller at location 130. A portion 132 of the disc driver controller that controls the actuation of the read/write head assembly 112 is broken out and illustrated schematically on the right side of FIG. 1. One or more of the read/write transducers 110 provide data indicating a sensed actuator position θ (track) on line 134 to a demodulator 136. Demodulator 136 demodulates the sensed actuator position θ, putting the data in a digital form that is coupled along line 138 to processor 140. Processor 140 includes RAM 142 and ROM 144 and generates a signal on line 146 for controlling the voice coil motor 118. The signal on line 146 is amplified by power amplifier 148. Power amplifier 148 provides an output current I that couples along line 150 to the voice coil motor 118 and controls the angular or mechanical position $\theta_M$ of read/write head assembly 112. Processor 140 includes a setpoint input 152 that receives reference data, typically from a CPU of a personal computer, indicating a desired actuator position $\theta_d$. ROM 144 stores instructions for a voice coil motor controller process or algorithm that controls the read/write head position $\theta_M$ so that data can be read or written on the desired (setpoint) track on the storage surfaces 106 of disc pack 126. The disc drive 100 has the MEMS accelerometer 157 mounted on or in close proximity to the disc drive 100. MEMS accelerometer 157 generates an accelerometer output that is coupled along line 156 to processor 140. During a self test interval, the accelerometer output is an integrity output indicating the mechanical integrity of MEMS accelerometer 157.

The processor 140 includes instructions stored in ROM 144 for a process or algorithm that provides in-situ testing of the MEMS accelerometer 157. The processor 140 provides an output on line 158 that represents the integrity of the MEMS accelerometer 157 as a result of the in-situ test. The in-situ test is described in more detail below in connection with examples shown in FIGS. 2–9. The function of controller 140 under normal or natural operating conditions is to provide closed loop control of the positioning of the voice coil motor 118 so that data on the disc pack 126 can be read or written. The controller 140 can also perform an in-situ test function when needed. The in-situ test can be performed automatically from time to time, or it can be manually invoked to obtain diagnostic information when there has been a failure of the disc drive 100.

It will be understood by those skilled in the art that the processor 140 can execute other support functions for the disc drive 100 as well. Portion 132 of the disc drive controller can be implemented as a single integrated circuit or it can be implemented in several integrated circuits or include discrete circuit components depending on the application.

Figure 2:
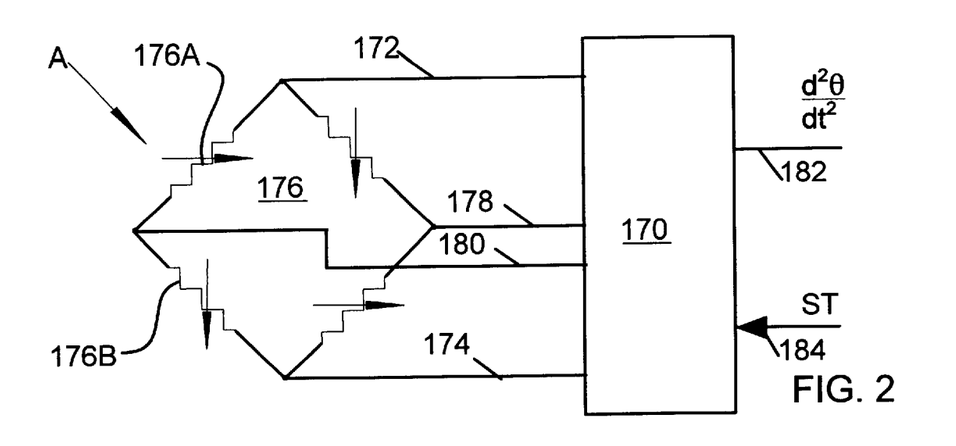
FIG. 2 illustrates a piezoresistive MEMS accelerometer circuit with a self test input ST.

FIG. 2 illustrates an accelerometer circuit 170 that provides electrical excitation along conductors or lines 172, 174 to a MEMS accelerometer 176 that includes a piezoresistive bridge as illustrated. The piezoresistors in MEMS accelerometer 176 change their electrical resistance in response to strain that is induced by acceleration. The MEMS accelerometer 176 is typically batch fabricated using microstructure fabrication techniques such as masking, etching, chemical deposition and the like. The extremely small size and complexity of the MEMS accelerometer 176 makes its difficult to visually inspect for cracks, contamination, scratches or other damage to integrity. Accelerometer circuit 170 is typically a portion of a processor such as processor 140 illustrated in FIG. 1. The MEMS accelerometer 176 is mounted in an orientation that allows the MEMS accelerometer 176 to sense an acceleration "A". The MEMS accelerometer 176 couples an accelerometer output on lines 178, 180 to the accelerometer circuit 170. The accelerometer output on lines 178, 180 is a low level analog acceleration output that is not directly useful in a controller. Circuit 170 receives the low level analog acceleration output on lines 178, 180 and provides a corresponding higher level, preferably digital, acceleration output on line 182. Depending on the needs of the processor, circuit 170 can include a differential-to-single line amplifier circuit, an analog-to-digital converter circuit, a compensation circuit or any combination of these circuits for generating an acceleration output on line 182. Typically, the MEMS accelerometer 176 is arranged to sense rotational vibration (RV) of a disc drive such as disc drive 100 of FIG. 1. The output of MEMS accelerometer 176 can then be used in the processor 140 to provide rotational vibration feedforward (RVFF) compensation to the voice coil motor 118 under normal operating conditions.

Circuit 170 receives a self test input ST on line 184 for signalling circuit 170 to perform a self test during a self test interval. When circuit 170 receives a high logic level on line 184, circuit 170 applies an electrical signal to MEMS accelerometer 176 that electrically simulates an acceleration. The electrical signal tests the MEMS accelerometer 176 for integrity. MEMS accelerometer 176 has electrical parameters that indicate the integrity of the MEMS accelerometer 176. A number of different electrical properties indicating integrity can be used, either individually or in combination, and the following example is illustrative of one method of testing integrity.

In this example, during a self test interval, circuit 170 momentarily connects conductor 180 to conductor 172, which effectively short circuits, piezoresistor 176A while connecting a full bridge excitation potential from conductors 172, 174 across piezoresistor 176B. As a result of the momentary connection, piezoresistor 176A cools a small amount, while piezoresistor 176B heats up a small amount since the excitation applied is increased. Piezoresistors 176A, 176B have temperature sensitive resistances, and the momentary short circuit thus results in a brief imbalance in the bridge output across conductors 178, 180 immediately after the short circuit is removed.

The brief imbalance across conductors 178, 180 simulates an acceleration applied to MEMS accelerometer 176. Circuit 170 senses or measures the imbalance immediately after the short circuit is removed. Circuit 170 provides a correspondingly simulated acceleration output on line 182. The simulated acceleration output on line 182 is an indication of the integrity of the MEMS accelerometer 176. If there is a broken conductor in MEMS accelerometer 176, the magnitude of the simulated acceleration, in other words the integrity output on line 182, will be outside of limits stored in memory in the circuit 170.

This example illustrates how the excitation connections can be changed during a self test interval, and how an output of the MEMS accelerometer 176 during the self test interval can be interpreted to indicate whether the MEMS accelerometer 176 is intact. Other arrangements can be used as well, including arrangements that measure resistances or that establish desired self test conditions by use of a separate heating element integrated into the MEMS accelerometer 176 to produce thermal strain that simulates strain due to rotational acceleration.

Figure 3:
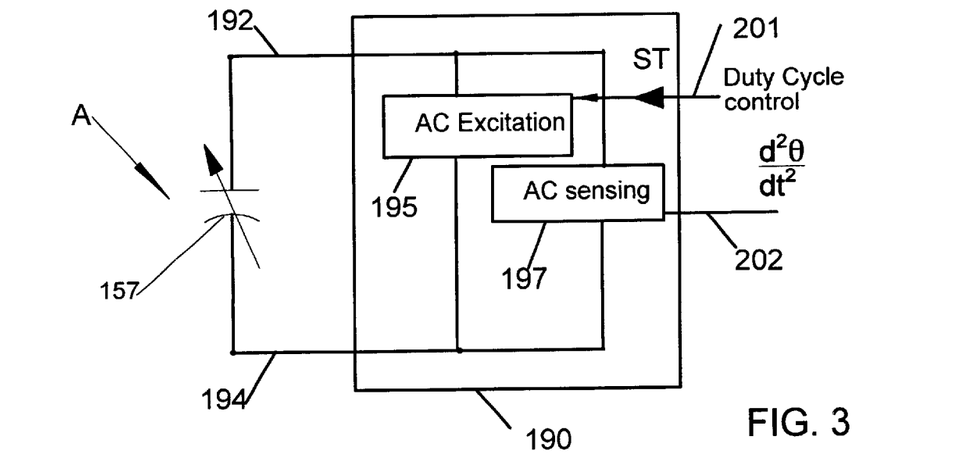
FIG. 3 illustrates a capacitive MEMS accelerometer circuit with a self test input ST.

FIG. 3 schematically illustrates an accelerometer circuit 190 that provides excitation along lines 192, 194 to a MEMS accelerometer 157 that includes a capacitive rotational vibration MEMS accelerometer as illustrated. The rotational vibration MEMS accelerometer 157 preferably comprises a central mass or rotor supporting multiple radial rotor capacitor plates that move with the rotor. The MEMS accelerometer 157 also preferably includes a stator surrounding the rotor that includes radial stator capacitor plates that are interleaved with the rotor capacitor plates. Multiple gaps between the rotor and stator capacitor plates collectively form a variable capacitance as illustrated at 157. Multiple variable capacitances in a half bridge or full bridge arrangement can also be used. The rotor, stator and capacitor plates of the MEMS accelerometer 157 are batch fabricated using microstructure fabrication techniques such as masking, etching, metal deposition and the like. The extremely small size and complexity of the MEMS accelerometer 157 makes it difficult to visually inspect for loose particles in internal gaps or cavities, contamination, scratches or other damage to integrity. Accelerometer circuit 190 is typically a circuit that has been integrated into a single package with the MEMS accelerometer 157. The MEMS accelerometer 157 is mounted in an orientation that allows its to sense a rotational acceleration "A" that is substantially the same as acceleration experienced by an associated disc drive. The MEMS accelerometer 157 couples an accelerometer output on lines 192, 194 to the accelerometer circuit 190. The accelerometer circuit 190 includes an "AC Excitation"portion 195 that provides an excitation current to the MEMS accelerometer 157. The accelerometer circuit 190 also includes an "AC Sensing" portion 197 that senses changes in the capacitance of MEMS accelerometer 157. The excitation can be a fixed current and then voltage can be sensed as illustrated, or alternatively, the excitation can be a fixed voltage and then current can be sensed. Circuit 190 provides an acceleration output on line 202. Depending on the needs of the processor, circuit 190 can include an electric charge measurement circuit, an analog-to-digital converter circuit, a compensation circuit or any combination of these circuits for generating an acceleration output on line 202.

Circuit 190 also receives a self test input ST on line 201 for testing the integrity of the MEMS accelerometer 157. MEMS accelerometer 157 has electrical parameters that, under controlled conditions, indicate the integrity of the MEMS accelerometer 157. A number of different combinations of a controlled condition and a corresponding electrical property indicating integrity can be used, either singly or in combination.

In one combination, the MEMS accelerometer 157 is mounted on the disc drive. The self test signal ST is a "Duty Cycle Control" signal at line 201. The duty cycle control signal applied to the circuit 190 varies the duty cycle of the AC excitation to effectively apply a DC bias to the capacitor plates in MEMS accelerometer 157. The DC bias generates a calibrated electrostatic force between the capacitor plates in the MEMS accelerometer 157 that simulates the force that would be produced by a rotational acceleration. If circuit 190 detects noise on lines 192, 194 during a self test interval the noise indicates the presence of loose particles or broken plates in capacitor gaps in the MEMS accelerometer 157. If circuit 190 detects a deflection of the MEMS accelerometer 157 that is too large or too small during a self test interval, an error flag can be set, or the accelerometer circuit 190 can be recalibrated, or both. The DC bias applied by duty cycle control is thus a condition that can be applied in-situ for performing a self test.

Figure 4:
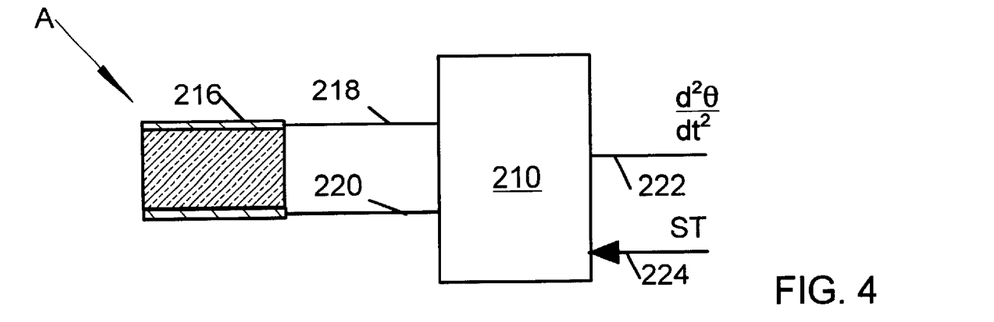
FIG. 4 illustrates a piezoelectric MEMS accelerometer circuit with a self test input ST.

FIG. 4 schematically illustrates a piezoelectric MEMS accelerometer circuit 210 that receives acceleration signals along lines 218, 220 from a piezoelectric accelerometer 216. The MEMS accelerometer 216 is typically batch fabricated using microstructure fabrication techniques such as masking, etching, metal deposition and the like. The extremely small size and solid construction of the MEMS accelerometer 216 makes its difficult to visually inspect for contamination, cracks or other damage to integrity. Accelerometer circuit 210 is typically a portion of a processor such as processor 140 illustrated in FIG. 1. The MEMS accelerometer 216 is mounted in an orientation that allows it to sense an acceleration "A". The MEMS accelerometer 216 couples an accelerometer output on lines 218, 220 to the accelerometer circuit 210. The accelerometer output on lines 218, 220 is a low level analog acceleration output that is not directly useful in a controller. Circuit 210 receives the low level analog acceleration output on lines 218, 220 and provides a corresponding higher level, preferably digital, acceleration output on line 222. Depending on the needs of the processor, circuit 210 can include an amplifier circuit, an analog-to-digital converter circuit, a compensation circuit or any combination of these circuits for generating an acceleration output on line 222.

Circuit 210 also receives a self test or integrity input ST on line 224 for testing the integrity of the MEMS accelerometer 216. MEMS accelerometer 216 has electrical parameters that indicate the integrity of the MEMS accelerometer 216. A number of different combinations of a controlled condition and a corresponding electrical property indicating integrity can be used, either singly or in combination.

In one example, when a self test signal is applied at line 224, the circuit 190 tests the MEMS accelerometer for electrical resistance. If electrical resistance exceeds magnitude limits stored in circuit 210, this indicates the presence of contamination on surfaces of MEMS accelerometer 216 and the integrity output on line 222 indicates a failure. The integrity output is the output on line 222 during the self test interval.

FIGS. 2–4 illustrate exemplary self test features in piezoresistive, capacitive and piezoelectric type MEMS accelerometers. Examples illustrated in connection with one type of MEMS accelerometer can be appropriately applied to other types of MEMS accelerometers,as well.

Figure 5:
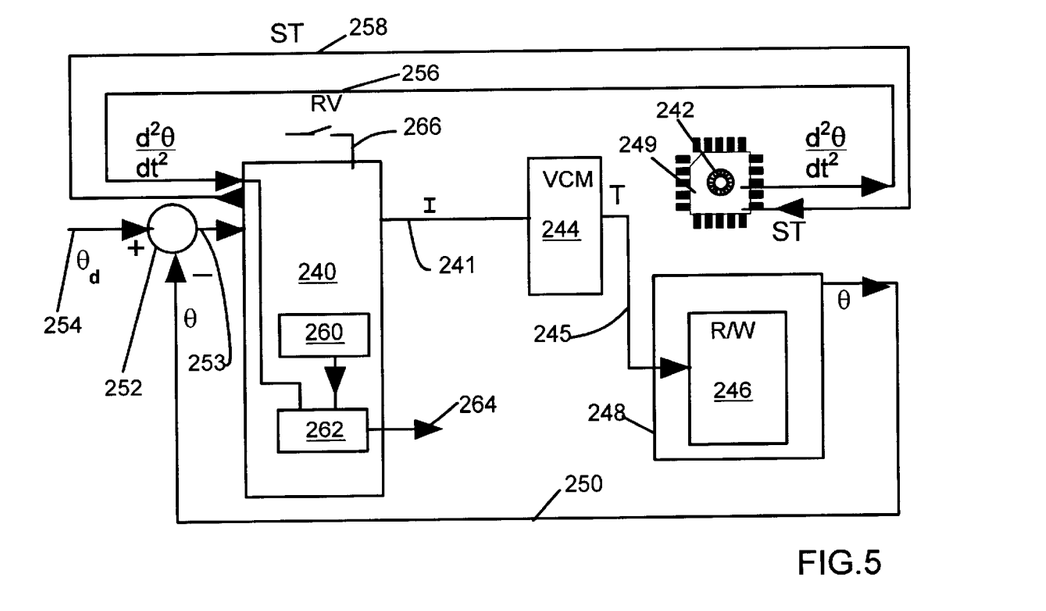
FIG. 5 illustrates an embodiment of a disc drive controller using a MEMS accelerometer.

FIG. 5 illustrates an embodiment of a disc drive controller 240 using a MEMS accelerometer 242 that provides rotational vibration feedforward (RVFF) control to a voice coil motor 244 that actuates a read/write head 246. In FIG. 5, MEMS accelerometer 242 and its associated accelerometer circuitry 249 are preferably arranged together in an integrated circuit that is mounted to a circuit card which is mounted in a disc drive. Controller 240 generates a current I on line 241 that couples to voice coil motor 244. Voice coil motor 244 provides a torque T on line 245 that positions the read/write head 246. Circuitry 248 associated with the read/write head 246 generates a sensed actuator position e that couples along line 250 to a summing junction 252. A desired actuator position or setpoint input $\theta_d$ is coupled along line 254 to the summing junction 252. The summing junction 252 provides an error output on line 253 to the controller 240. The error output is the difference between the desired actuator position $\theta_d$ and the sensed actuator position θ. MEMS accelerometer 242 is arranged to sense rotational vibration of the disc drive. The MEMS accelerometer 242 is coupled to accelerometer circuitry 249 which generates a rotational vibration output RV on line 256. MEMS accelerometer circuitry 249 receives a self-test input ST on line 258 as explained above in connection with FIGS. 2–4. The rotational vibration output RV and the self test input ST are coupled to the controller 240.

Under natural operating conditions, the controller 240 provides current I to the voice coil motor 244 as a function of the error output from summing junction 252 and the rotational vibration output on line 256. Under these natural or normal operating conditions, the controller controls the position of the read/write head 246 to track the setpoint or desired actuator position on line 254. The controller 240 compensates for rotational vibration to provide better positioning of the read/write head 246 when vibration is present.

The controller 240, however, can be placed in a self test routine either automatically or as the result of operator intervention. When the controller 240 is placed in such a self test routine, the controller 240 performs an in-situ test on MEMS accelerometer 242. Controller 240 establishes a desired in-situ condition conducive to the in-situ test during an in-situ test interval. Typically, the controller 240 provides duty cycle control to self test input 258 of the accelerometer circuit 249 to establish an in-situ condition conducive to self testing as explained in more detail above in connection with FIG. 3. The in-situ environment condition can also include temporarily disabling calibration setting in the MEMS accelerometer circuit 249.

The controller 240 also includes a stored reference 260 that represents at least one characteristic limit of the integrity output on line 256. A test circuit 262 receives at least one integrity output value from line 256 and the stored reference 260 during the in-situ test interval. The test circuit 262 compares the integrity output on line 256 to the stored reference 260 and generates an in-situ test output 264 representative of integrity of the MEMS accelerometer 242. It will be understood by those skilled in the art that the test circuit 262 can be implemented in software, hardware, or a combination of hardware and software.

In one preferred arrangement, the test circuit 262 successively compares a plurality of integrity values on line 256 with a plurality of characteristic limits from stored reference 260, and the test circuit 262 averages a plurality of successive samples of the integrity output on line 258. An example of such a preferred arrangement is explained in more detail below in connection with FIGS. 8A–8B–8C–8D.

If desired, the controller 240 can also include a self-test switch circuit 266 that can be manually activated to initiate the self test. During a normal or natural operation interval, the MEMS accelerometer 242 operates without an applied DC bias or shift in duty cycle. The DC bias or duty cycle is shifted during the self test interval to establish the desired condition.

Figure 6:
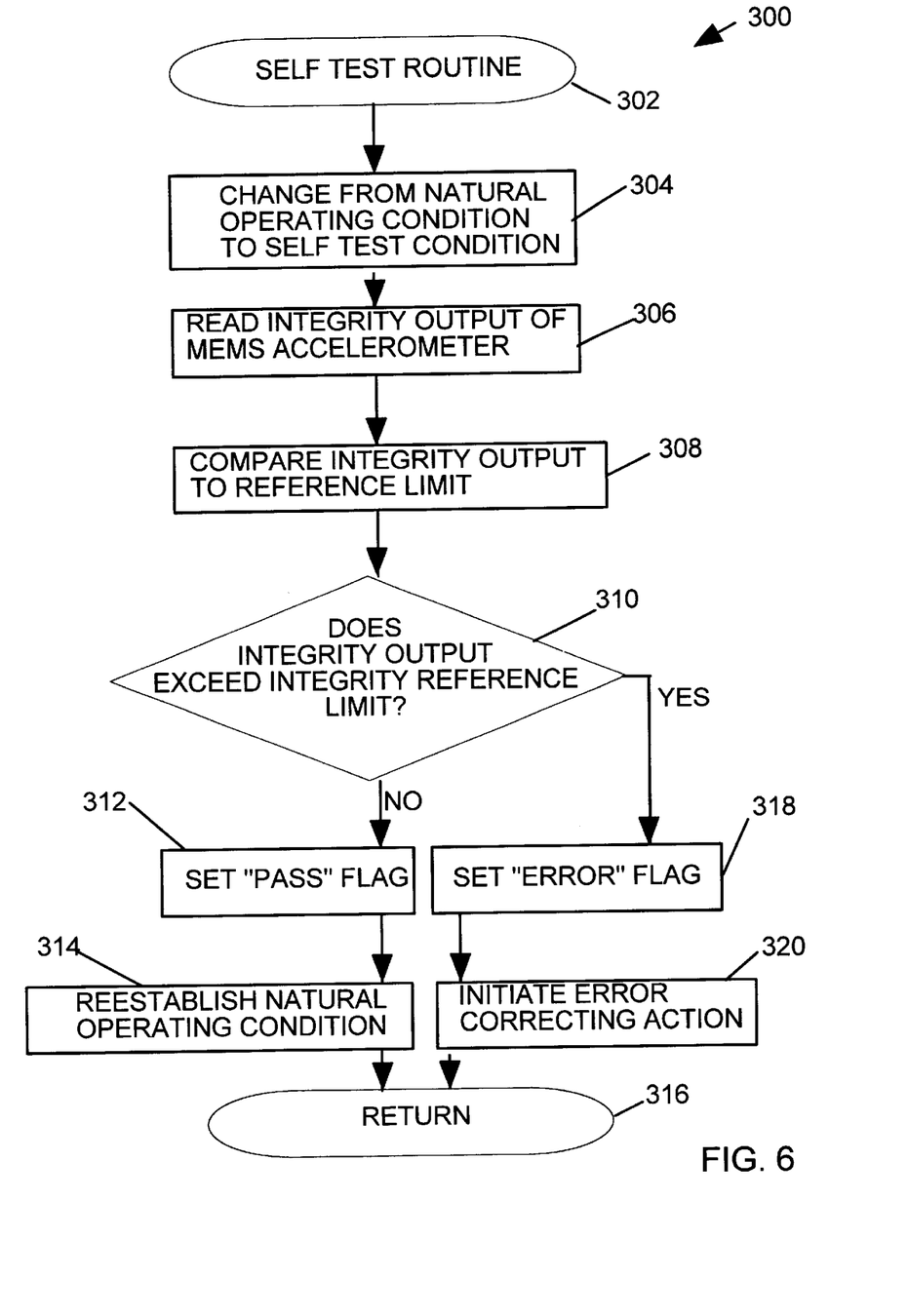
FIG. 6 illustrates a first embodiment of a self test algorithm using an integrity input of a MEMS accelerometer.

FIG. 6 illustrates a first embodiment 300 of a self test algorithm or routine using an integrity output of a MEMS accelerometer. The algorithm performs an in-situ test on the MEMS accelerometer in a disc storage system. The self test routine starts at 302. First, a change is made from natural, closed loop feedback operating conditions to a self test condition as illustrated at step 304. Step 304 establishes an in-situ condition conducive to performing an in-situ test during an in-situ test interval. Typically, the in-situ condition is a simulated acceleration signal at the output of the MEMS accelerometer that serves as an integrity output. Next, an integrity output of a MEMS accelerometer is read at step 306, and the integrity output is compared to a stored reference limit at step 308.

After the comparison is made at step 308, a decision is made at step 310 based on the comparison. If the integrity output is not outside the reference limit or limits, then the program continues to step 312 where a pass flag is set, indicating that the MEMS accelerometer shows no sign of unacceptable degradation. After the pass flag is set at step 312, then natural, closed loop operating conditions are reestablished at step 314, and the program flow returns to normal operation at 316.

If the integrity output of the MEMS accelerometer is outside the reference limit or limits at decision step 310, then an error flag is set at step 318 and error-correcting action is initiated at step 320. The error correcting action at step 320 can be notifying an operator of the problem, or recalibrating the MEMS accelerometer to bring it back within reference limits. After completion of step 320, the program flow returns to normal operation at 316.

Prior to performing the steps illustrated in FIG. 6, a reference value is stored representing a reference limit of an integrity output of the MEMS accelerometer. This stored reference value is then available for the comparison illustrated at step 308.

The "pass" and "error" flags set at steps 312 and 318 form an in-situ test output representative of the integrity of the MEMS accelerometer.

Figure 7A:
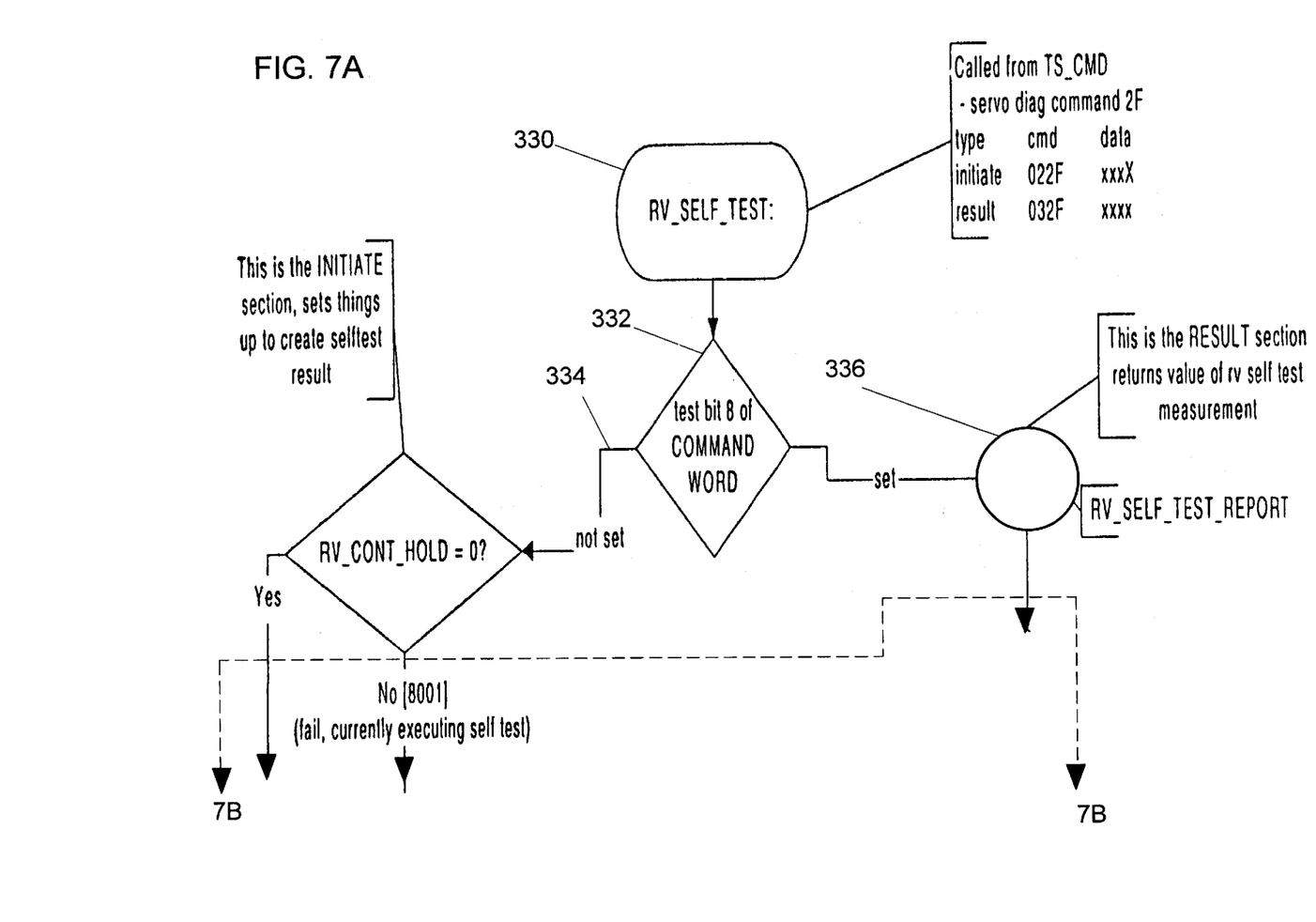
FIGS. 7A–7B–7C–7D together illustrate a second embodiment of a self test algorithm using an integrity input of a MEMS accelerometer.
Figure 7B:
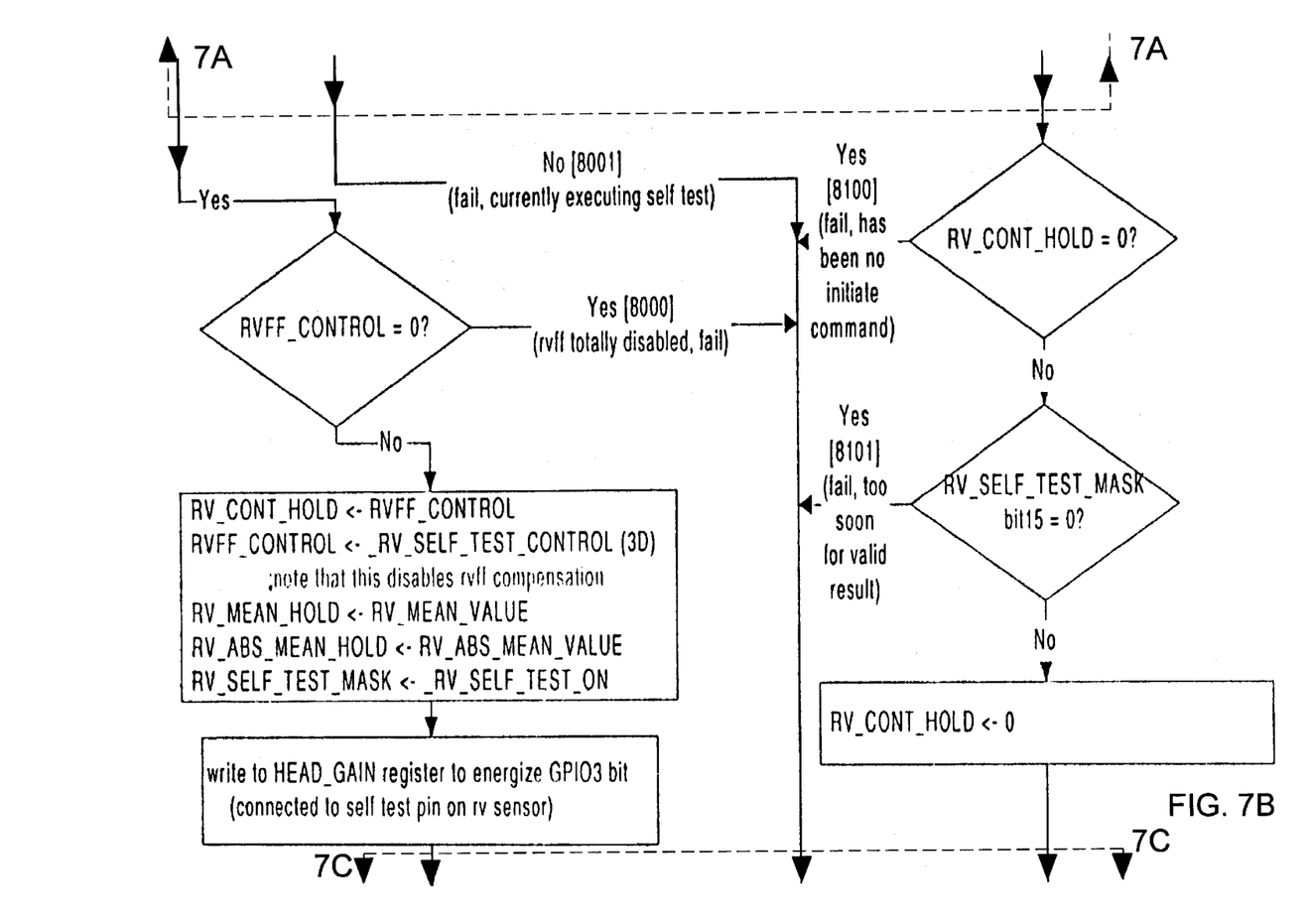
Figure 7C:
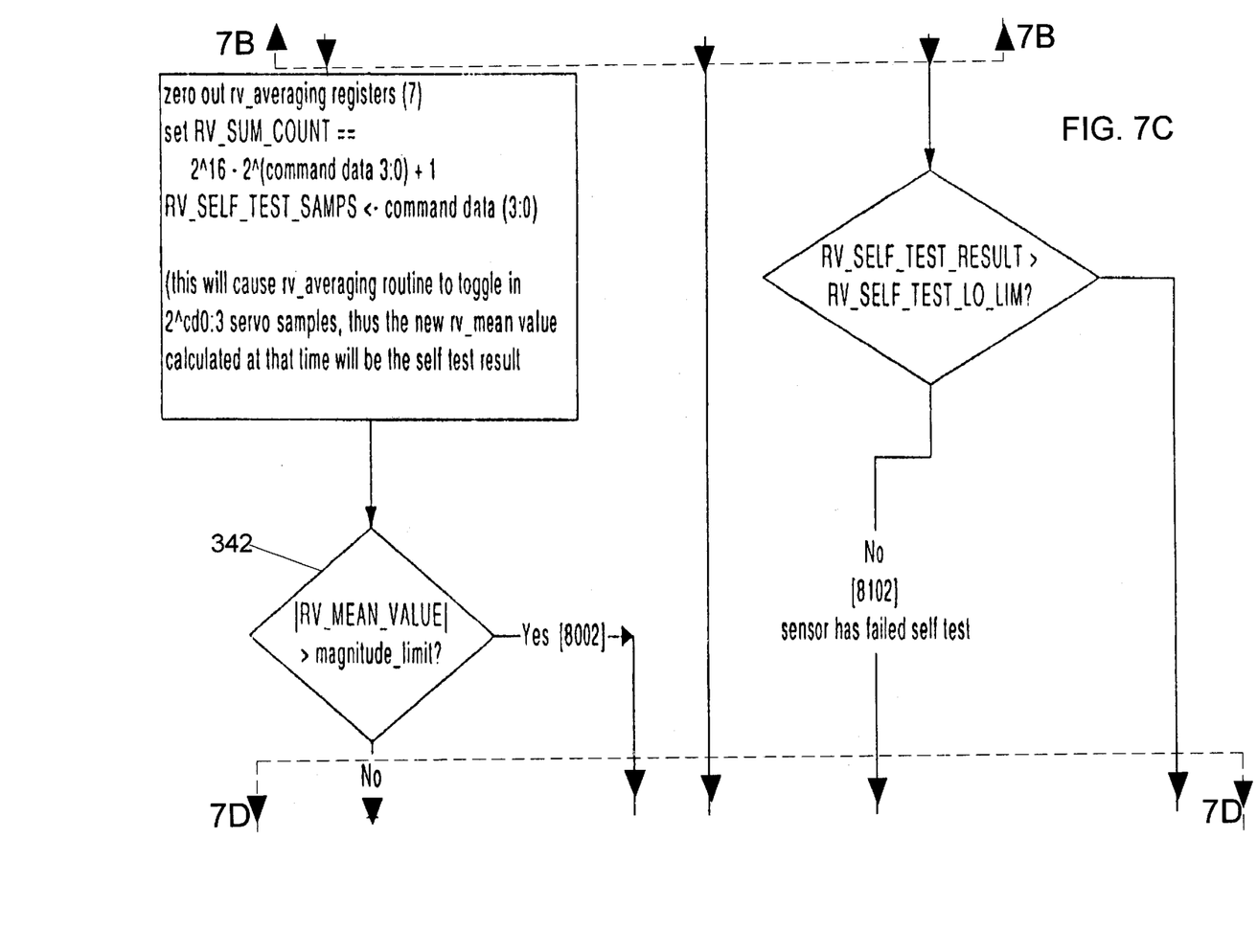
Figure 7D:
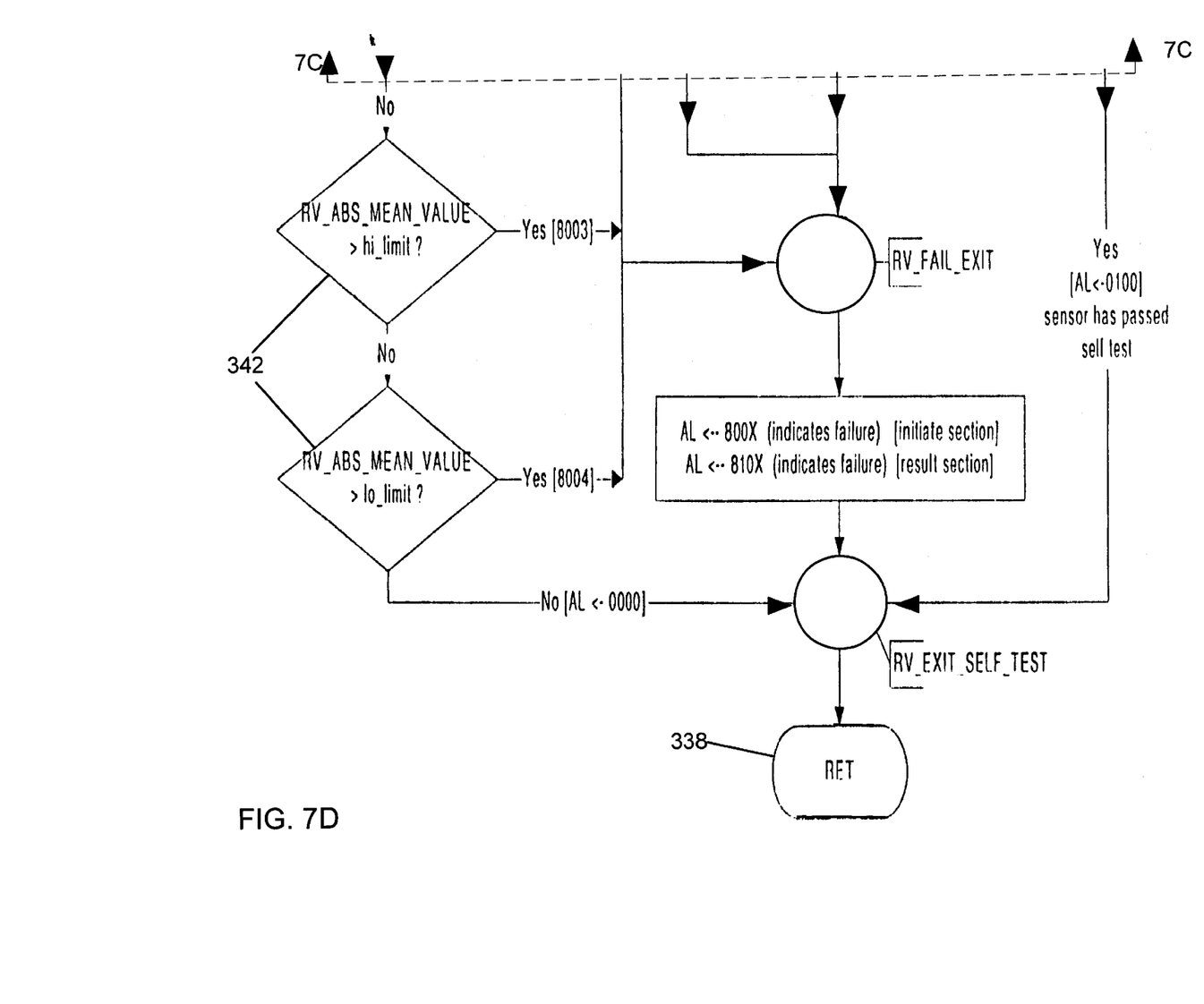

FIGS. 7A–7B–7C–7D together illustrate a second embodiment of a self test algorithm using an integrity output of a MEMS accelerometer for sensing rotational vibration (RV). FIG. 7A is arranged to be placed above FIG. 7B so that the dashed line 7B–7B is aligned with dashed line 7A–7A. FIG. 7B is placed above FIG. 7C, and FIG. 7C is placed above FIG. 7D to form a detailed flow chart of the second embodiment. Program flow starts near the top of the flow chart at 330. An initial test of a bit in a command word is performed at 332 to either select performing self test steps along the left side of the flow chart starting at 334 or select processing the results of previous self test steps along the right side of the flow chart starting at 336.

As MEMS accelerometer failures are found in the self-test routine along the left side of FIGS. 8A–8B–8C–8D, code numbers are passed to the results processing routine along the right side of the FIGS. 8A–8B–8C–8D. There are a plurality of failure modes which are tested in succession in response to a self test command. The code numbers, e.g. 8000, 8001, 8002, 8003, 8004 indicate failures. The failure code numbers are useful in diagnosing field failures in disc drives. The code number 0000 indicates that the MEMS accelerometer has passed the in-situ test. On completion of self testing and processing self test results, program flow returns to normal operation at 338. At 340 in FIG. 8B, an RV_AVERAGING routine is used to toggle in samples for evaluation. At 340, a plurality of successive samples of the integrity or self test output ST are averaged. This RV_AVERAGING routine improves noise immunity and is explained in more detail in connection an example described in FIGS. 9A–9B–9C below.

At 342, the samples are successively compared to multiple stored values, which better identifies failure modes.

If desired, a portion or all of the self test features can operate in the background, in other words interleaved in time with normal disc drive operations so that the self test time intervals are transparent or nearly transparent to the user. Multiple samples can be accumulated from the MEMS accelerometer over an extended period of time. These samples taken over an extended period of time average out to zero if the MEMS accelerometer circuit is properly calibrated. The average over an extended period of time tends to zero because the entire disc drive is placed or mounted in some position that does not spin under ordinary conditions of use. If the long term average is found to be nonzero during an extended time interval, the accelerometer circuit can be automatically recalibrated or offset to reset the zero point. The offset or recalibration is stored in RAM.

Figure 8A:
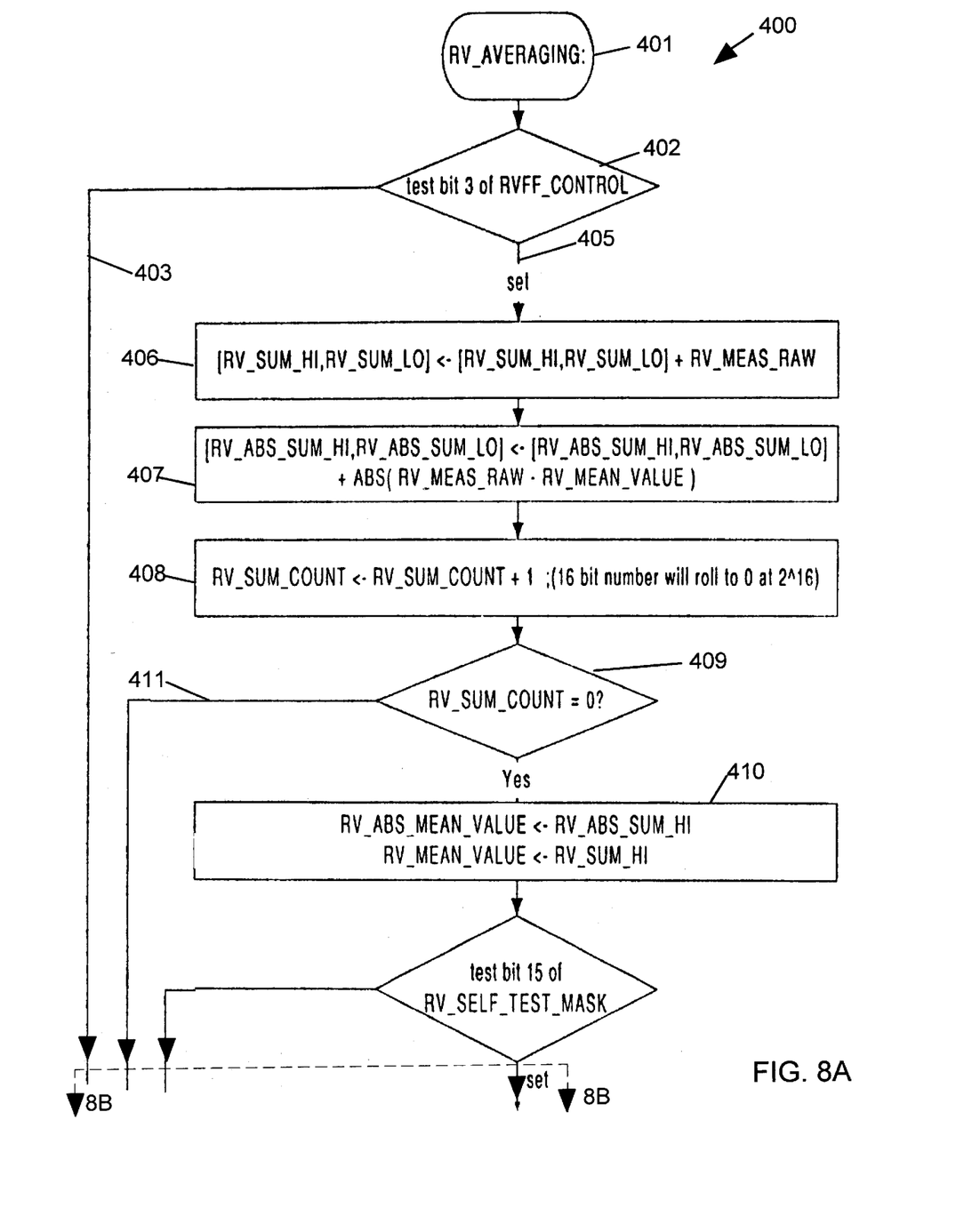
FIGS. 8A–8B–8C together illustrate an embodiment of an averaging algorithm that can be used in a self test algorithm using a self test input of a MEMS accelerometer.
Figure 8B:
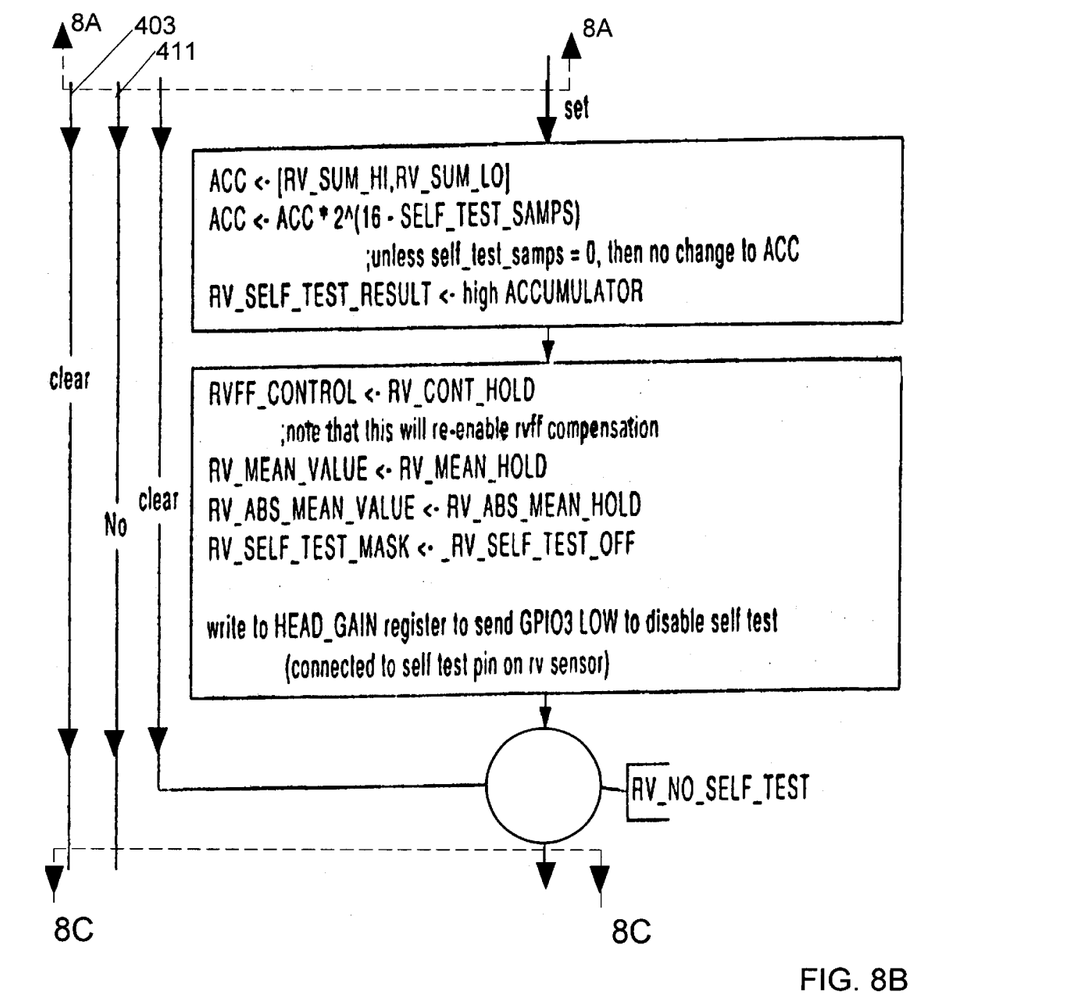
Figure 8C:
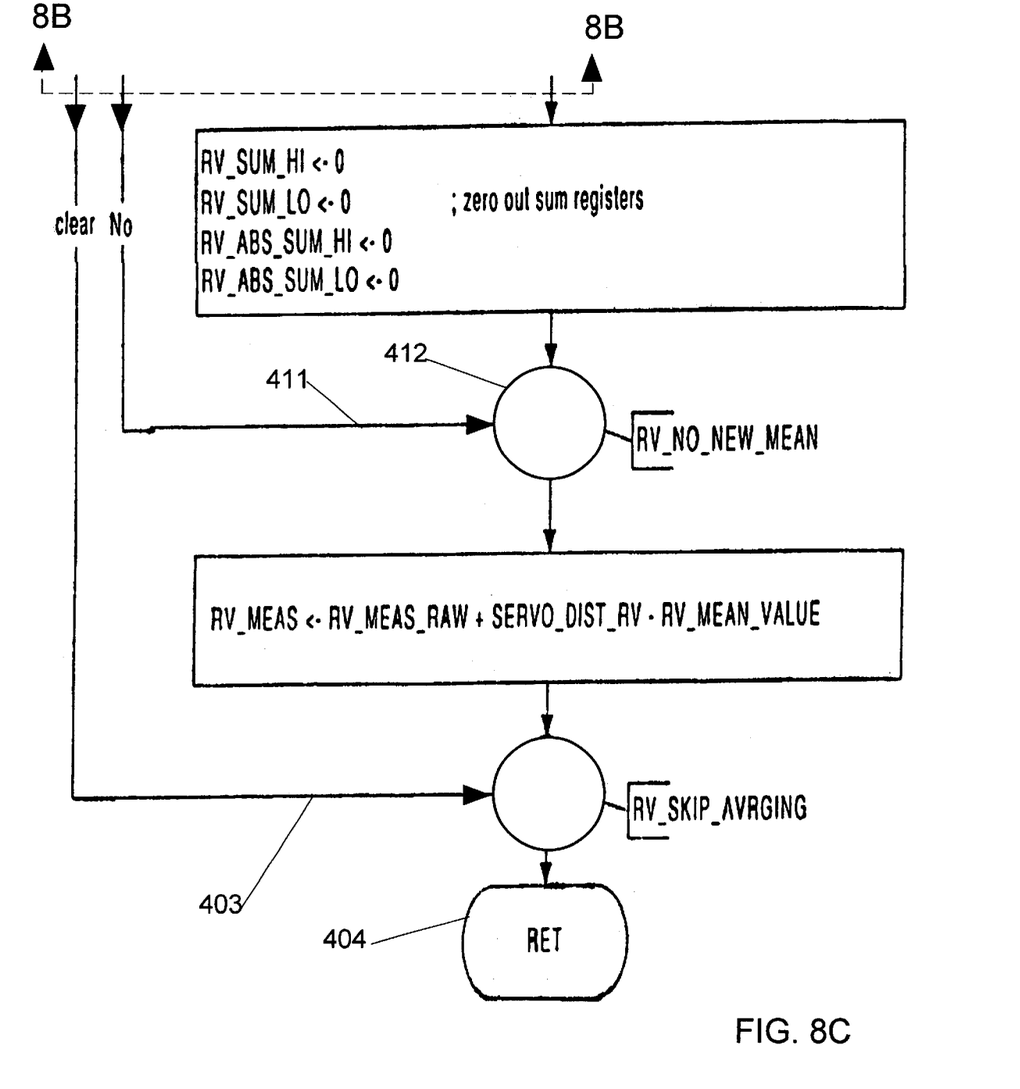

FIGS. 8A–8B–8C together illustrate an embodiment of an averaging algorithm 400 that can be used in a self test algorithm using an integrity output of a MEMS accelerometer. FIG. 8A is arranged to be placed above FIG. 8B so that the dashed line 8B–8B is aligned with dashed line 8A–8A to form a detailed flow chart of the averaging algorithm 400. FIG. 8B is placed above FIG. 8C.

The averaging algorithm 400 starts at 401. At decision point 402, a bit is tested to ascertain whether to invoke averaging or skip averaging during the current pass or loop of the program. If averaging is to be skipped, then program flow continues along line 403 to return to the main in-situ test program (such as illustrated in FIGS. 8A–8B–8C–8D) at return 404. If averaging is to be invoked during the current pass of loop of the program, then program flow continues along line 405 after decision point 402.

In steps 406, 407, 408, samples are toggled in to accumulate multiple average values of multiple self test characteristics. At decision point 409, an counter is tested to see if the desired number of samples has been reached on this pass through the averaging algorithm 400. If the desired number of samples has been reached, then the accumulated averages are passed to registers for use in the main in-situ test program at 410. If the desired number of samples has not been reached at decision point 409, then program flow continues along line 411 to RV_NO_NEW_MEAN at 412.

In summary, a method and circuit are disclosed that perform an in-situ test on a MEMS accelerometer (157, 176, 216, 242) in a disc storage system (100). The circuit (132) includes a controller (140, 240) that establishes a desired in-situ condition conducive to the in-situ test during an in-situ test interval. The circuit also includes a stored reference (260) representing at least one characteristic limit of an integrity output of the MEMS accelerometer. The circuit also includes a test circuit (262) that is adapted to receive at least one integrity output value (RV on line 256) and the stored reference (260) during the in-situ test interval and that generates an in-situ test output (264) representative of integrity of the MEMS accelerometer.

In one preferred embodiment, the test circuit (262) successively compares (308, 342) each of a plurality of integrity values with at least one characteristic limit. The test circuit (262) can average a plurality of successive samples of the integrity output. A self-test input circuit (266) is coupled to the controller (240, 268) wherein activation of the self-test input defines the in-situ test interval.

Degraded integrity or damage to a MEMS accelerometers can be diagnosed in-situ. Mounting of a second accelerometer or other sensors for diagnosis can be avoided. Disassembly of the MEMS accelerometer for diagnosis can also avoided.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Although the preferred embodiments described herein are directed to disc drives, it will be appreciated by those skilled in the art that the teachings of the present invention can be applied to other storage systems where MEMS accelerometers are used, without departing from the scope and spirit of the present invention.

What is claimed is:

1. A disc storage system including a circuit for performing an in-situ self test on a MEMS accelerometer that is coupled to the disc storage system, the circuit comprising:

a controller configured to apply a self test input comprising a duty cycle control signal to the MEMS accelerometer during a self test interval to establish a self test condition that comprises a simulated acceleration induced by the duty cycle control signal;

a stored reference representative of at least one characteristic limit of an integrity output of the MEMS accelerometer; and a test circuit configured to receive at least one MEMS integrity output value from the MEMS accelerometer during the self test interval and to generate an in-situ test output representative of integrity of the MEMS accelerometer subject to the simulated acceleration induced by the duty cycle control signal and based on the MEMS integrity output value and the stored reference.

2. The disc storage system of claim 1 wherein the test circuit successively compares each of a plurality of integrity values with at least one characteristic limit.

3. The disc storage system of claim 1 wherein the test circuit averages a plurality of successive samples of the integrity output.

4. The disc storage system of claim 1 further comprising:

a self-test switch circuit coupled to the controller wherein activation of the self-test switch defines the in-situ test interval.

5. The disc storage system of claim 1 wherein the MEMS accelerometer provides closed loop acceleration feedback during a normal operation interval, and the closed loop feedback is disabled during the self test interval to establish the desired self test condition.

6. The disc storage system of claim 1 wherein the MEMS accelerometer has an acceleration output that is coupled to a controller controlling the position of the read/write head assembly, the MEMS accelerometer providing rotational vibration feedforward compensation to the controller.

7. The disc storage system of claim 1 wherein the self test condition comprises a simulated acceleration and the integrity output of the MEMS accelerometer comprises an acceleration output of the MEMS accelerometer.

8. The disc storage system of claim 1 wherein the self test condition comprises disabling calibration of the MEMS accelerometer.

9. A method of performing an in-situ test on a MEMS accelerometer in a disc storage system, comprising:

(a) establishing a self test condition conducive to performing an in-situ self test during a self test interval, the self test condition including simulating acceleration by applying of a duty cycle control signal to the MEMS accelerometer;

(b) storing a reference value representing a reference limit of an integrity output of the MEMS accelerometer;

(c) receiving the integrity output and the stored reference value during the self test interval at a test circuit; and (d) generating an integrity-indicative test output in the test circuit when the simulated acceleration induced by the duty cycle control signal is applied.

10. The method of claim 9, further comprising:

(e) successively comparing a plurality of integrity values with a plurality of characteristic limits in the test circuit.

11. The method of claim 10, further comprising:

(f) averaging a plurality of successive samples of the integrity output in the test circuit.

12. The method of claim 11, further comprising:

(g) activating a self-test switch coupled to the control circuit; and (h) defining the in-situ test interval as a function of the self-test switch activation.

13. The method of claim 9, further comprising:

(e) providing closed loop feedback of a read/write head position during a normal operation interval, and (f) disabling the closed loop feedback during the self test interval to establish the desired condition.

14. The method of claim 9, further comprising:

(e) mounting the accelerometer on the disc storage system, and (f) coupling an output of the accelerometer to a controller controlling the position of the read/write head assembly during a normal operation interval.

15. The method of claim 9, further comprising:

(e) mounting the accelerometer on a frame of a disc drive; and (f) providing a warning of acceleration of the disc drive frame as a function of an output of the accelerometer.

16. The method of claim 9, further comprising:

(e) disabling calibration of the integrity output to establish the in-situ condition.

17. The method of claim 9 further comprising (e) storing a plurality of sequences of instructions describing steps (a), (c) and (d) on a computer readable medium, the plurality of sequences of instructions including sequences which, when executed by a processor in the disc storage system, cause the processor to perform the in-situ test.

18. A disc storage system including a circuit for performing an in-situ test on a MEMS accelerometer, comprising:

a stored reference representative of at least one characteristic limit of an integrity output of the MEMS accelerometer; and means for generating an in-situ test output representative of integrity of the MEMS accelerometer based upon the MEMS integrity output value when a simulated acceleration is induced by a duty cycle control signal and the stored reference.

* * * * *

UNITED STATES PATENT AND TRADEMARK OFFICE
CERTIFICATE OF CORRECTION

PATENT NO. : 6,629,448 B1
DATED : October 7, 2003
INVENTOR(S) : Dustin M. Cvancara It is certified that error appears in the above-identified patent and that said Letters Patent is hereby corrected as shown below:

<u>Title page,</u>
Item [57], ABSTRACT,
Line 6, after "integrity output of the" delete ","

Signed and Sealed this

Twenty-fifth Day of May, 2004

JON W. DUDAS
*Acting Director of the United States Patent and Trademark Office*